(12) United States Patent
Frewin et al.

(10) Patent No.: US 10,489,404 B2
(45) Date of Patent: Nov. 26, 2019

(54) MACROCOSM MONITOR SERVICE PLATFORM

(71) Applicant: ADP, LLC, Roseland, NJ (US)

(72) Inventors: Trevor John Lakeland Frewin, Peterborough (GB); Andrew Karl Nightingale, Piddington (GB); William Geraint Jones, Soham (GB); Shane Philip Bough, Peterborough (GB); Paul Gareth Bisp, Uppingham (GB)

(73) Assignee: ADP, LLC, Roseland, NJ (US)

( * ) Notice: Subject to any disclaimer, the term of this patent is extended or adjusted under 35 U.S.C. 154(b) by 281 days.

(21) Appl. No.: 14/750,024

(22) Filed: Jun. 25, 2015

(65) Prior Publication Data
US 2016/0378835 A1 Dec. 29, 2016

(51) Int. Cl.
*G06F 16/2455* (2019.01)
*H04L 12/24* (2006.01)
*G06F 11/30* (2006.01)

(52) U.S. Cl.
CPC ........ *G06F 16/24568* (2019.01); *G06F 11/30* (2013.01); *H04L 41/50* (2013.01); *G06F 16/2455* (2019.01)

(58) Field of Classification Search
CPC ....... G06F 11/30; G06F 16/2455; H04L 41/50
See application file for complete search history.

(56) References Cited

U.S. PATENT DOCUMENTS

| 6,070,190 A * | 5/2000 | Reps ................ G06F 11/3495 709/203 |
| 7,027,808 B2 | 4/2006 | Wesby |
| 7,058,704 B1 | 6/2006 | Mangipudi et al. |
| 7,853,958 B2 | 12/2010 | Mathew et al. |
| 8,605,394 B2 | 12/2013 | Crookham et al. |
| 8,898,681 B1 | 11/2014 | Acheff et al. |

(Continued)

FOREIGN PATENT DOCUMENTS

WO WO2006032890 A2 3/2006

OTHER PUBLICATIONS

Robert, Kanasz. "Introduction to CQRS." Online, Mar. 3, 2013, retrieved Mar. 4, 2013. 10 pages.*

(Continued)

*Primary Examiner* — Charles E Lu
(74) *Attorney, Agent, or Firm* — Yee & Associates, P.C.

(57) ABSTRACT

A network of computers providing improved data retrieval. The network includes a service platform providing a service to other computers outside of the network. The network also includes a command module deployed on the service platform performing a monitoring action independently or upon request for a capture of data. The network also includes a query module deployed on the service platform responding to requests for a return of data, the query module being independent of the command module. The command module and the query module are implemented using command-query separation based on imperative computer programming. Independence of command and query enable the capture of and review of data to be evolved independently from each other, enabling dynamic change management and responsiveness of monitoring relative to an agent-based service monitoring platform.

20 Claims, 5 Drawing Sheets

(56) References Cited

U.S. PATENT DOCUMENTS

| | | | |
|---|---|---|---|
| 8,935,221 B1* | 1/2015 | Lazier | G06F 17/30303 |
| | | | 707/690 |
| 2005/0188370 A1* | 8/2005 | Kouznetsov | G06F 9/468 |
| | | | 717/174 |
| 2005/0216421 A1* | 9/2005 | Barry | G06F 11/0709 |
| | | | 705/64 |
| 2006/0078859 A1 | 4/2006 | Mullin | |
| 2006/0242284 A1* | 10/2006 | Savage | H04L 41/046 |
| | | | 709/223 |
| 2014/0160971 A1 | 6/2014 | Ketonen | |
| 2014/0304399 A1 | 10/2014 | Chaudhary et al. | |

OTHER PUBLICATIONS

"System Center Operations Manager," https://en.wikipedia.org/wiki/System_Center_Operations_Manager, accessed Jun. 25, 2015, 4 pages.

\* cited by examiner

MACROCOSM MONITOR SERVICE PLATFORM

BACKGROUND INFORMATION

1. Field

The present disclosure relates to methods and devices for creating special purpose networks whose hardware and programming enable dynamic and efficient data retrieval when monitoring systems.

2. Background

System monitoring in an enterprise environment has always been complex and challenging. Many commercial systems claim to proactively monitor, automate, and report on information technology services and infrastructure for improved efficiencies. However, existing commercial systems have one thing in common, they deploy agents to monitor various aspects of the network and monitor results reported by each agent. In other words, the data these commercial systems monitor reflects the data the agents are coded to retrieve. This mechanism does not provide a desired flexibility, as monitoring priorities and the environment can change rapidly.

SUMMARY

The illustrative embodiments provide for a network of a plurality of computers, each comprising a corresponding processor, a corresponding bus, and a corresponding memory. The network includes a service platform configured to provide a service to other computers outside of the network, the service platform comprising computer usable program code executable by one or more of the plurality of computers of the network. The network also includes a command module deployed on the service platform in one or more of the plurality of computers, the command module configured to perform a monitoring action, wherein the command module performs monitoring independently or upon request for a capture of data, and wherein the command module comprises computer usable program code executable by one or more of the plurality of computers. The network also includes a query module deployed on the service platform in one or more of the plurality of computers, the query module configured to respond to requests for a return of data, wherein the query module is independent of the command module, wherein the query module comprises computer usable program code executable by one or more different ones of the plurality of computers. The command module and the query module are implemented using command-query separation based on imperative computer programming. Independence of command and query enable the capture of and review of data to be evolved independently from each other, enabling dynamic change management and responsiveness of monitoring relative to an agent-based service monitoring platform.

The illustrative embodiments also provide for a method implemented by a network of a plurality of computers, each computer in the network comprising a corresponding processor, a corresponding bus, and a corresponding memory. The method includes providing a service, using a service platform, to other computers outside of the network, the service platform comprising computer usable program code executable by one or more of the plurality of computers of the network. The method also includes performing a monitoring action, using a command module deployed on the service platform in one or more of the plurality of computers, wherein the command module performs monitoring independently or upon request for a capture of data, and wherein the command module comprises computer usable program code executable by one or more of the plurality of computers. The method also includes responding to requests for a return of data, using a query module deployed on the service platform in one or more of the plurality of computers, wherein the query module is independent of the command module, wherein the query module comprises computer usable program code executable by one or more different ones of the plurality of computers. The command module and the query module are implemented using command-query separation based on imperative computer programming. Independence of command and query enable the capture of and review of data to be evolved independently from each other, enabling dynamic change management and responsiveness of monitoring relative to an agent-based service monitoring platform.

The illustrative embodiments also provide for a non-transitory computer readable storage medium storing computer usable program code which, when executed by one or more processors, implements a method implemented by a network of a plurality of computers, each computer in the network comprising a corresponding processor, a corresponding bus, and a corresponding memory. The computer usable program code includes computer usable program code for providing a service, using a service platform, to other computers outside of the network, the service platform comprising computer usable program code executable by one or more of the plurality of computers of the network. The computer usable program code also includes computer usable program code for performing a monitoring action, using a command module deployed on the service platform in one or more of the plurality of computers, wherein the command module performs monitoring independently or upon request for a capture of data, and wherein the command module comprises computer usable program code executable by one or more of the plurality of computers. The computer usable program code also includes computer usable program code for responding to requests for a return of data, using a query module deployed on the service platform in one or more of the plurality of computers, wherein the query module is independent of the command module, wherein the query module comprises computer usable program code executable by one or more different ones of the plurality of computers. The command module and the query module are implemented using command-query separation based on imperative computer programming. Independence of command and query enable the capture of and review of data to be evolved independently from each other, enabling dynamic change management and responsiveness of monitoring relative to an agent-based service monitoring platform.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that system monitoring in an enterprise environment has always been complex, challenging, and dynamic. Many commercial systems claim to proactively monitor, automate, and report on information technology (IT) services and infrastructure for improved efficiencies in these services and infrastructure. However, existing commercial systems have one thing in common: they deploy agents to monitor various aspects of the network and monitor results reported by each agent. This fact creates two issues, the first of which is that the data these commercial systems monitor reflects only the data the agents are coded or configured to retrieve. The second issue is that this technique provides little flexibility, as monitoring priorities and the environment can change rapidly.

The illustrative embodiments recognize and take into account that using coded agents may be an undesirably inflexible form of monitoring. Thus, in contrast to such prior monitoring agents, the data recorded by the command objects in the monitoring of the system of the illustrative embodiments does not have to be what the various query objects are coded to retrieve. Instead, the illustrative embodiments provide for a separation between what data command objects are coded to retrieve from the system, and what data the system provides to end user based on queries. The system of the illustrative embodiments may rely on dynamic data architecture for data storage and data query.

The Macrocosm Monitor of the illustrative embodiments is a service platform for the extensible collection of, and dynamic presentation of, environmental and configuration management data across the spectrum of dashboards, notifications, and trend graphs. Macrocosm Monitoring of the illustrative embodiments leverages the command-query design pattern of computer programming, including extensions for data analytics systems.

The dynamic nature of the illustrative embodiments enable the modification of the system to respond in near real-time to the changing monitoring (data capture) and analysis (data review) needs of specific teams of users.

Existing monitoring systems are inadequate in this regard. For example, for the System Centre Operations Manager (SCOM) by MICROSOFT® Corporation, agents are present all over the network that is being monitored. These agents can only retrieve data for which they have been programmed to retrieve. Other currently available monitoring systems may focus on security, networking, or some other specific thing, technology, or aspect. However, such systems typically have the same disadvantages as SCOM.

The illustrative embodiments also provide another distinguishing difference relative to such prior monitoring systems. As opposed to the hub and spoke architecture adopted by SCOM, Macrocosm Monitoring of the illustrative embodiments may leverage the command-query programming pattern to enable the command modules of the service to be placed independently of the query modules. This independence means that the command modules can be deployed independently, in isolation, or next to the items within the Macrocosm that are being monitored, as desired. Furthermore, the independence of the query components means that the query modules can be deployed centrally or nearest the view-points (web servers for dashboards, email servers for notifications, etcetera). Significantly, the illustrative embodiments provide for complete independence of the deployment of the command modules and the deployment of the query modules.

This independence between command modules and query modules has several advantages. For example, this independence means that the two types of modules may be scaled differently. Thus, for example, query modules and command modules may be deployed in fewer or greater numbers relative to each other in response to security, performance, or bandwidth needs. Additionally, this independence means that new query or command modules may be constructed or developed to respond to changing monitoring and management needs within the Macrocosm of the illustrative embodiments.

Still further, the independence of the command modules means that they may be chained. Likewise, the query modules may be chained. The term "chained command modules" means that one module is built aggregating data from one or more command modules. The term "chained query modules" means that one module is built aggregating data from one or more query modules. Thus, for example, when the monitoring of an environment or environments grows in maturity it may be found expedient to build one command module that aggregates data from one or more other command modules and to interleave, summarize, analyze or decorate the data and record the composed facts as new data.

As shown above, the illustrative embodiments of the Macrocosm Monitoring Service provide for several advantages over existing data monitoring services. The examples described above are exemplary only and do not necessarily limit the claimed inventions. Attention is now turned to the Figures.

Figure 1:
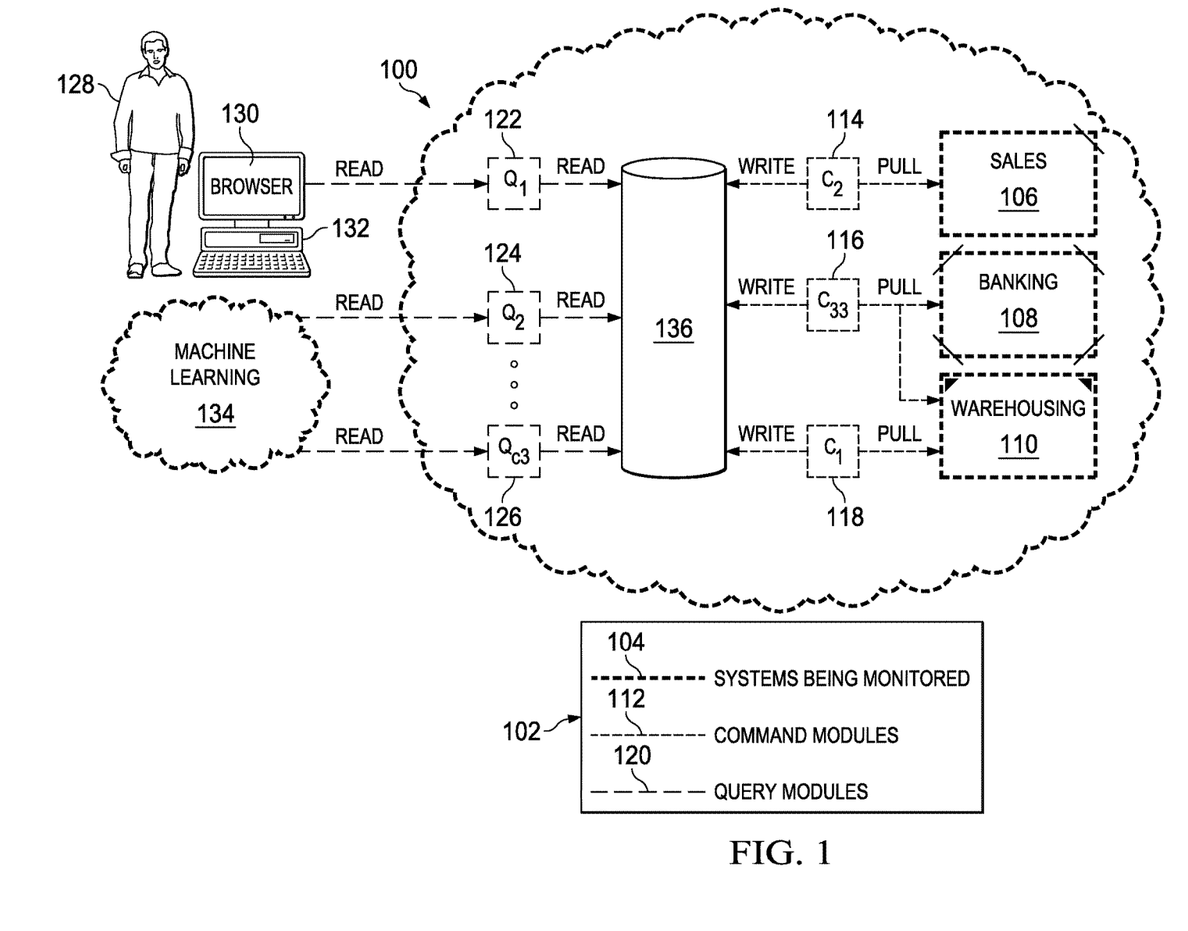
FIG. 1 is a schematic of a command-query based monitoring system, in accordance with an illustrative embodiment.

FIG. 1 is a schematic of a command-query based monitoring system, in accordance with an illustrative embodiment. The Macrocosm Monitoring System of the illustrative embodiments operates in the context of service platform 100, which provides some service such as, for example, consumer goods manufacturer. The Macrocosm Monitoring System of the illustrative embodiments includes one or more command modules and one or more query modules which are made independent of each other using command-query separation based on imperative computer programming. The network of service platform 100 and the various modules of the Macrocosm Monitoring System shown in FIG. 1 may be executed using one or more processors operating on one or more computers. This illustrates how query 1 122, query 2 124, and query 3 126 serve data to individuals 128 or machine learning 134 independently of the structure of: the data recorded by command modules in place (114, 116 and 118); and the nature of systems under inspection (106, 108 and 110). For purposes of clarity, the individual computers and the service platform hosting command and query modules are not shown in FIG. 1, rather the relationship of the modules and monitored systems are shown. However, any of these one or more computers may be, for example, data processing system 500 of FIG. 5.

Legend 102 shows the types of objects operating in the context of service platform 100. Dashed lines 104 represent systems being monitored. Such systems may include computers, systems, networks, and software used to implement a variety of services, such as but not limited to sales system 106, banking system 108, and warehousing system 110. Dashed lines 112 represent command modules that are part of the Macrocosm Monitoring System of the illustrative embodiments, such as but not limited to command module $C_2$ 114, command module $C_{33}$ 116, and command module $C_1$ 118. Dashed lines 112 also represent commands or functions shown being performed by these modules, as described further below. Dashed lines 120 represent query modules that are part of the macrocosm monitoring service of the illustrative embodiments, such as but not limited query module $Q_1$ 122, query module $Q_2$ 124, and query module $Q_3$ 126. Dashed lines 120 also represent commands or functions shown being requested of or performed by these modules, as described further below. Note that the names of the modules shown in FIG. 1, both command and query, are provided solely to demonstrate that they are different from one another.

As described above, a useful aspect of the Macrocosm Monitoring System of the illustrative embodiments is that the query modules and the command modules are independent of each other by using command-query separation based on imperative computer programming. Command and Query Responsibility Segregation (CQRS) is a principle of imperative computer programming. This principle states that every method should either be a command that performs an action, or a query that returns data to the caller, but not both. In other words: the action of recording a fact cannot return any fact(s); and the action of checking for facts can only return fact(s) that pre-exist the asking of the question. More formally, queries on the system cannot change the state of the system; commands on the system cannot return any state information. Thus, in some illustrative embodiments, the command modules and query modules may be executed outside of the network of systems being monitored.

Figure 2:
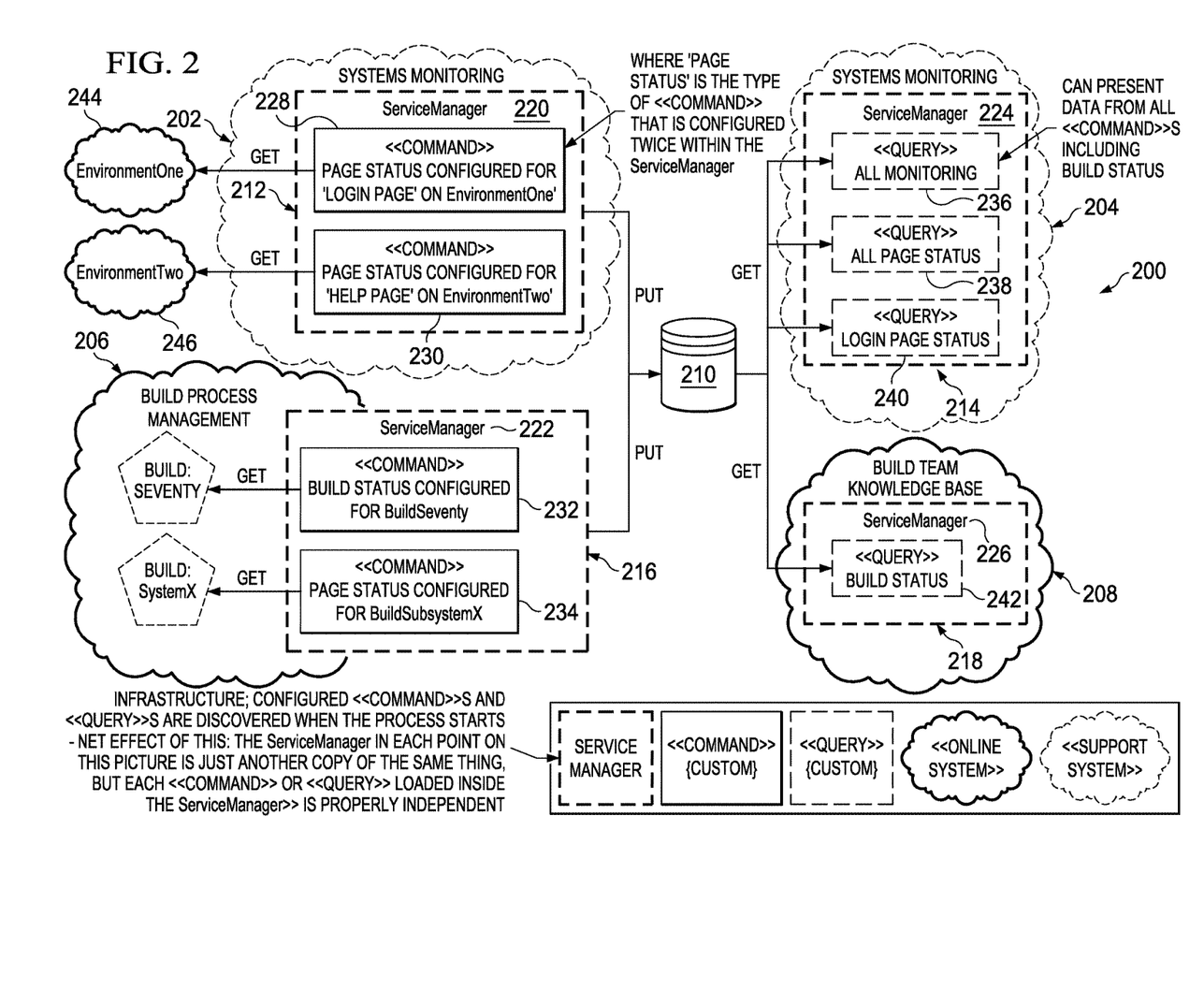
FIG. 2 is another schematic of a command-query based monitoring system, in accordance with an illustrative embodiment.

For example, in an illustrative embodiment, a service platform is a container that can host one or more modules, such as command or query modules. The service platform can run on the same infrastructure computers as the items under monitor, or entirely independently using other computers such as shown in FIG. 2. FIG. 2 shows networks set up solely for the independent execution of the service platform with individual modules in each instance of the service platform. The use of different service platforms may be driven by the desires of the customer, such as security concerns that drive access challenges.

Returning to FIG. 1, individual command modules might also be independent of each other, and likewise individual query modules might also be independent of each other. However, if desired, either type of module may be chained such that one module makes use of the output, input, or functionality of another module. In any case, the command modules shown by dashed lines 112 are independent of the query modules shown by dashed lines 120.

Because of this independence, a number of advantages over existing monitoring systems may be achieved. For example, the command modules need not be embedded in a pre-determined system shown by dashed lines 104. Instead, if desirable, a command module may be placed in a system, or simply pull information from such a system across a network boundary. As a result, the Macrocosm Monitoring System of the illustrative embodiments that use independent command and query modules are far more flexible in terms of what data is tracked or measured, and where this recording takes place. The command modules enjoy greater flexibility in that they can capture data across system boundaries because they can be deployed in space that is independent. Additionally, the data returned by the query modules may be different from the structure or granularity of the data captured. For example, query modules and command modules may be scaled differently, and thus may be deployed in fewer or greater numbers relative to each other in response to security, performance, or bandwidth needs. Still further, this independence means that new command modules may be constructed or developed to respond to changing monitoring and management needs within the network of systems of the illustrative embodiments. Still further, the independence of the command modules means that they may be chained such that data recorded by a command module deployed for several systems can record data that, in turn, is monitored at a collective or higher level using a command module that analyses or summarizes the fine grained data.

Attention is now turned to an operational use of the Macrocosm Monitoring System of the illustrative embodiments. Again, the Macrocosm Monitoring System of the illustrative embodiments primarily includes the command modules, shown by dashed lines 112, and the query modules, shown by dashed lines 120. However, the Macrocosm Monitoring System of the illustrative embodiments may also include the high level software that allows user interaction with one or more of these modules, and may also include any software that implements machine learning or other automatic queries that accesses these modules.

Thus, for example, individuals 128 may use browser 130 executing on computer 132 to send a read command to one or more query modules, such as query module Q1 122. Alternatively, machine learning 134 or other automated software may send such a read command to one or more query modules, such as query module Q2 124 and query module Q3 126. Machine learning 134 may include any type of software that is programmed to automatically query a query module, or may include heuristics, neural nets, or other artificial intelligence. Additionally, the example extends to machine learning 134 querying the same query modules used by the browser 130 if the need arises, and vice versa.

In whatever manner a query is sent to a query module, the corresponding query module reads information from data storage 136. Data storage 136 may be one or more physical data storage units, possibly distributed across a network. Data storage 136 acts as a clearinghouse for information retrieved by the command modules and requested by the query modules.

The command modules pull information from the monitored systems and then write that information to data storage 136. In an illustrative embodiment, the command modules may be requested to retrieve information in response to a request or on a schedule built into or configured in the command module.

The command modules may be used to fetch data from components of legacy monitoring systems or specific data or events in the production systems. For example, the banking system may call $C_2$ 114 to invoke the command module to pull data from the sales system at a specific point in time. The command module may be invoked in this instance because this action is deemed significant in the business. A query module might be used to present this data unchanged to the user when the user is using a system that calls the query module. A command module may subscribe to significant events in a corporate enterprise service bus (ESB) or other messaging infrastructure and pull data from the monitored system(s) in response to incoming events or messages.

However, in other illustrative embodiments the data flowing between query and command modules do not directly relate with each other, but rather the query module interprets the data in the data storage 136 as it prepares a response. On the other hand, it is theoretically possible for command and query modules to interact with each other. For example, command modules may be chained. Chaining command modules would best be performed by asynchronous programming, where the first command module in the chain records some data in data storage 136 and invokes the second command module (usually asynchronously) which then reviews the data in data storage 136 and records new data (usually analysis or summary or heuristic data) in data storage 136.

By contrast, chaining query modules would be performed by synchronous programming where the query module on the start of the chain calls two or more other query modules and returns analysis (or group or summary) directly. However, generally speaking a query cannot change the system state so it is not allowed to store this new analysis, not even in data storage 136—necessitating the synchronous execution model. Further, publishing an event or sending a message to a command module represents a change to system state. The use of such methods is possible, but may be disfavored in some cases.

It is possibly meaningful to chain command and query modules in one chain, but the real world case for this arrangement would be unusual. A workflow like this could grow to where the cost and complexity and security concerns of such a workflow grows into the highest common denominator of all actions in the workflow—a result this is generally discouraged as it inconsistent with reasons for using the separation that underpins the value of the illustrative embodiments.

FIG. 2 is another schematic of a command-query based monitoring system, in accordance with an illustrative embodiment. Macrocosm monitoring system 200 may be considered a variation of the Macrocosm Monitoring System described with respect to FIG. 1. Macrocosm monitoring system 200 monitors several disparate/unrelated networks, which includes one or more systems that provide some services such as, for example, web-based business services. These systems may include system 206, system 208, and possibly other systems. Macrocosm monitoring system 200 also includes central data storage 210 which is used by both of the command modules and the query modules.

System 202 and system 204 may be networks set up only to host the Service Platform, such as ServiceManager 220, ServiceManager 222, ServiceManager 224, and ServiceManager 226 as shown. In turn, each such ServiceManager may host some modules, such as for example command module 228, command module 230, command module 232, command module 234, query module 236, query module 238, query module 240, and query module 242. "EnvironmentOne" 244 and "EnvironmentTwo" 246 are networks offering web-based business services, to the public by example. System 206 and system 208 also may be networks that offer services to the company making money by offering "EnvironmentOne" 244 and "EnvironmentTwo" 246 to the public. Stated differently, "EnvironmentOne" 244 and "EnvironmentTwo" 246 may be production revenue generator environments in this hypothetical case. System 206 and system 208 may be among the systems the company uses to maintain and extend those revenue generators. In this case, system 206 and system 208 may also be considered production systems.

A benefit of command-query separation of the illustrative embodiments is seen here in that the command modules within system 202 hosted by service platform 212 (command module 228 and command module 230) may use specific security access directly into "EnvironmentOne" 244 and "EnvironmentTwo" 246. In this manner, system 202 may have privileges on production that a company may take seriously and monitor carefully for security integrity and protection of revenue generation. Additionally, performance and stability concerns in system 202 are separate from the operational concerns of the revenue generating "EnvironmentOne" 244 and "EnvironmentTwo" 246.

In a contrasting example, say for system 208 the Build Team Knowledge Base of system 208 has lower uptime requirements than "EnvironmentOne" 244 and "EnvironmentTwo" 246 where ad hoc downtime for short periods maybe acceptable because lack of access to the knowledge base on a week-end would not cause losses in revenue. Thus, the illustrative embodiments providing for command-query separation represent significant advantages over known monitoring systems. Furthermore, the command-query separation means that metrics made available through query module 236, also labeled as "<<QUERY>> ALL MONITORING", may interleave the data captured in system 202 and system 206, regardless of the differences among these spaces in terms of deployment, criticality, privacy, uptime requirements and security.

Each system may be provided with a service platform, such as service platform 212, service manager 214, service manager 216, and service manager 218. Each service platform may execute in software and/or on hardware infrastructure that supports the command and/or query modules, and may be copies of each other. Each such command module or query module are discovered when the service platform starts. Within each service platform, the various command modules and query modules are independent of each other. In this manner, not only is independence of the modules achieved, but also another goal of the illustrative embodiments is achieved by avoiding the cost of deploying all modules at the highest common denominator of security/privacy and scale.

In Macrocosm monitoring system 200, central data storage 210 serves as a clearinghouse for data used and retrieved by the various command modules and/or query modules. Central data storage 210 may be one or more physical data storage systems, possibly distributed across a network. The various modules of macrocosm monitoring system 200 either get or put information to or from central data storage 210 as shown in FIG. 2.

System 204 may be set up to host a service platform for reading data generally, separate from system 202 because it doesn't warrant all the security constraints that system 202 has to deal with because of its direct relationship with production. System 208 is an example of a legacy support network that has been built up over the years. System 206 is an example of a network that is usually independent of everything else to ensure that the build of software is protected from people interfering with the build process in an uncontrolled way.

Figure 3:
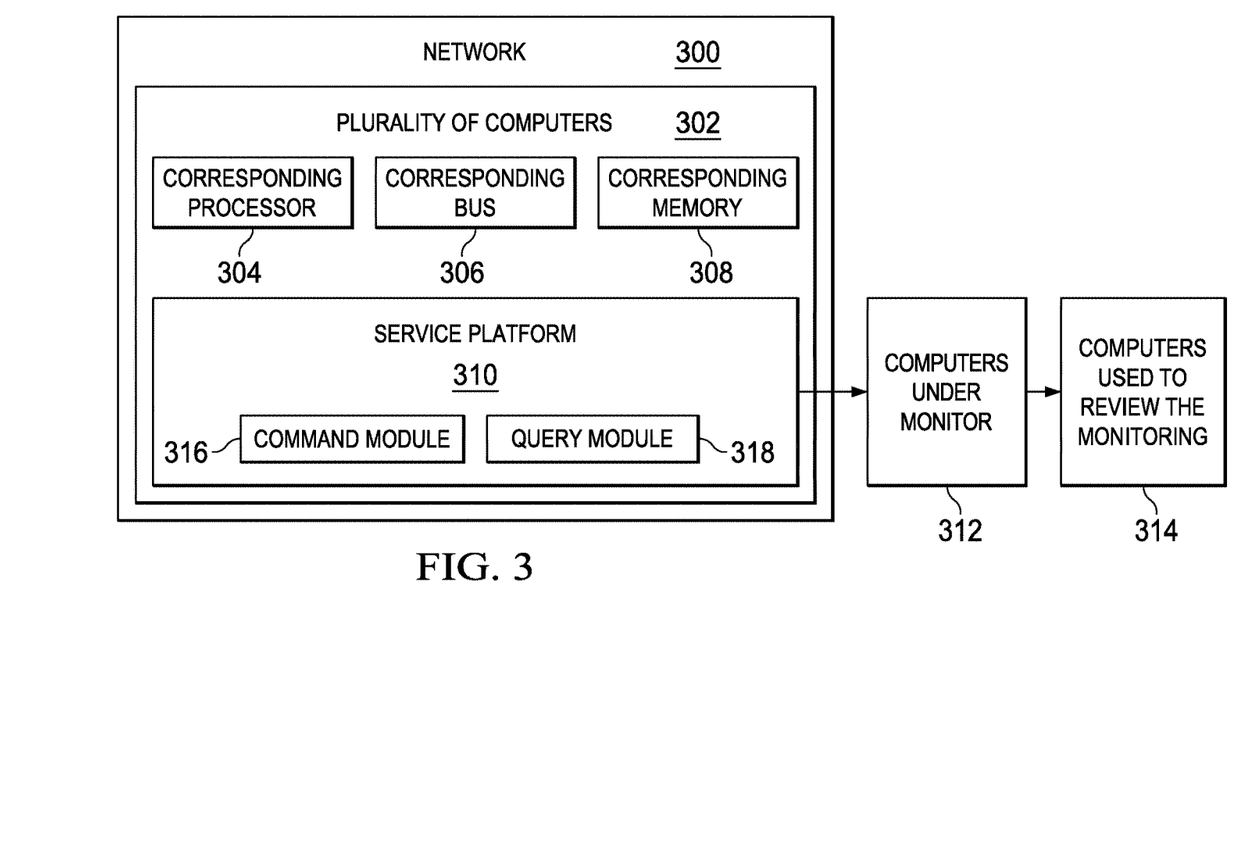
FIG. 3 is a block diagram of a computer network, in accordance with an illustrative embodiment.

FIG. 3 is a block diagram of a computer network, in accordance with an illustrative embodiment. Network 300 may be used to implement a macrocosm monitoring system as described with respect to FIG. 1 and FIG. 2. Network 300 may be a plurality of computers, each of which may be implemented using a data processing system such as data processing system 500 of FIG. 5. Thus, for example, network 300 may be plurality of computers 302, each comprising corresponding processor 304, corresponding bus 306, and corresponding memory 308. In an illustrative embodiment, network 300 may be a network of different networks. Computers under monitor 312 and computers used to review the monitoring 314 either receive data from query module 318 or respond with data to command module 316.

In an example, service platform 310 may be computer usable program code executable by one or more of plurality of computers 302 of the network 300. Service platform 310 may be a computer program that, when executed, hosts command modules or query modules as configured. Service platform 310 looks into its configuration and discovers which command or query modules to host.

In an example, network 300 also includes command module 316 deployed on service platform 310 in one or more of the plurality of computers, the command module configured to perform a monitoring action. The command module performs monitoring independently or upon request for a capture of data. The command module comprises computer usable program code executable by one or more of the plurality of computers.

Network 300 also includes query module 318 deployed on service platform 310 in one or more of plurality of computers 302. Query module 318 may be configured to respond to requests for a return of data. Command module 316 may be computer usable program code executable by one or more different ones of plurality of computers 302.

In an illustrative embodiment, command module 316 and query module 318 are implemented using command-query separation based on imperative computer programming. Command-query responsibility separation (CQRS) is a principle of imperative computer programming. This principle states that every method should either be a command that performs an action, or a query that returns data to the caller, but not both. In other words, asking a question must not modify the subject of the question in any way and updating the system must not return anything that could be construed as an answer to any question (implied or not). More formally, methods should return a value only if they are referentially transparent and hence possess no side effects and methods that have side effects should not return any value. By convention, it is permitted to return a request number or a request token which is a reference number for the command received.

In an illustrative embodiment, independence of command and query enable the capture of and review of data to be evolved independently from each other, enabling dynamic change management and responsiveness of monitoring relative to an agent-based service monitoring platform. The data may be data relating to monitoring of computers under monitor 312.

Attention is now turned to what is meant by "independence of command and query enable the capture and review of data to be evolved independently from each other." What may be captured in monitoring using the command module back in time cannot be changed, but the way in which those records are reviewed at the present can now change independently as a result of the independence of the command modules and the query modules. As a corollary, the data captured by command modules can be changed over time faster, or slower, than the view components. This result is possible because the query module or modules the views use can be upgraded to provide defaults until command modules comes online, or data type independence may be leveraged where it is available on the technology used for the data clearinghouse. Alternatively, command modules can be modified to capture additional data ahead of the query modules being published that present this data to a user or another system, or to analyze this data.

Attention is now turned to what is meant by "evolved" in the above quoted statement. "Evolved" or "evolution" in this context mean that the data in the systems being monitored, and the systems themselves, change over time so the command modules may have to be added, changed, and/or retired in response to internal changes. The query modules might also have to be added, changed, and/or retired when things outside of the system under monitor change.

For example, the regulatory requirements for the whole industry might change. In this case, an external entity may have to be notified when a specific thing happens. If a command module that is capturing data in this area already exists, then this command module could be left as is, but a new, specific, query module could be produced that notifies the staff or the external body immediately. In this manner, the data and the system have "evolved." As another example, priorities in the monitoring objectives might change. In this case, the command modules can stay the same but the queries and their use can be changed independently. Thus, the independence of the modules enable the capture and review of data to be evolved independently, which presents advantages not seen with prior monitoring systems.

The illustrative embodiments may be varied from those described above. For example, capturing the data may be separated from viewing of the data, as previously described. The command module may be one of a plurality of command modules, the query module may be one of a plurality of query modules, and the plurality of command modules may be deployed independently of the plurality of query modules In another example, a first type of data monitored by the command module may be different than a second type of data that the query module is programmed to retrieve. To illustrate this point, prior monitoring systems use agents that must retrieve data they have been programmed to receive, often in a manner that is vendor specific and cannot cross system or technology boundaries.

In another example, the query modules may use different technologies and semantics from the technologies and semantics of the command modules. In other words, the command modules could operate on a service platform for a programmable device from one technology supplier, a variant of UNIX® for example, and the query modules could operate on a service platform for a programmable device from another technology supplier, a variant of MICROSOFT® WINDOWS® for example. Also, the command module may collate data from collect different types of data on different schedules.

Independence here means that the data retrieved might be: 1) modified, translated, or summarized as it is returned; 2) may be from multiple commands; or 3) captured on or from a technologically differing platform. Note that the term "type of data" may refer to actual different data types (such as objects with different properties or files that use different extensions) or may refer to simply different information than had been originally expected for retrieval (such as to receive text information about a first aspect of the monitored system as opposed to text information about a second aspect of the monitored system). On the other hand, in a different illustrative embodiment, a first type of data monitored by the command module may be the same as a second type of data that the query module is programmed to retrieve.

In an illustrative embodiment the command module is deployed independently of the query module, in terms of number of deployments or the date(s) upon which they are deployed. Similarly, the command module may be isolated relative to other command modules in the network, and some query modules may be may be isolated relative to other query modules in the network.

In still another illustrative embodiment, the command module may be one of a plurality of chained command modules, or the query module may be one of a plurality of chained query modules. For example, when the monitoring of an environment grows in maturity it may be found to be expedient to build one or more command modules that aggregate data from one or more other command modules and interleave, summarize, or decorate this data accordingly.

In an illustrative embodiment the macrocosm monitoring system described with respect to FIG. 3 may be provided as a separate service that is offered to a third party, usually for a fee. Thus, in an illustrative embodiment, the command module and the query module may be received as a second service from one or more remote computers and wherein a client of the second service operates service platform 310.

Thus, the infrastructure upon which the command and query modules execute could be used by a third party. In such a case, the third party may build their own custom command and query modules, though custom command modules would be less common in real world scenarios. In some cases the output from the query modules might be exposed on a public interface, much the way an Internet service provider or cellular phone provider might show availability of services on their public web site. The independence of the queries, which may relate to showing information to the public maybe, and the commands, which may be kept secure and private, is a significant advantage of the illustrative embodiments.

In the case that the Macrocosm Monitoring System of the illustrative embodiments is provided as a second service, the client of the second service may have access to the query module, but not to the command module. In this case, the client is serving as a consumer of data from the environment under monitor. Alternatively, the client of the second service has access to the command module, but not to the query module. In this case the client is serving as provider of data into the system.

One of the benefits of the independence of the command modules and query modules is that the command modules can be placed closely with sensitive, secret, or confidential data and the command module can publish carefully de-sensitized data into that space that the query module or modules can then read. Thus, a command module might be programmable or deployable while still maintaining the confidentiality of data of one or both of the providers of the Macrocosm Monitoring System or the licensee of the Macrocosm Monitoring System.

Access to the query modules may be more useful in many cases. For example, a licensee of the Macrocosm Monitoring System may have access to a query module simply by using a Web browser to input queries and/or to change how the query module operates or is programmed. In some cases, the licensee may have access to the query modules in order to monitor systems it desires to monitor, but the licensor might maintain control over the command modules. This arrangement would suit the case where the licensor is providing a service, especially in the case where the command modules that have detailed knowledge of the inner workings of the service are private to the service provider. Other variations are possible.

Figure 4:
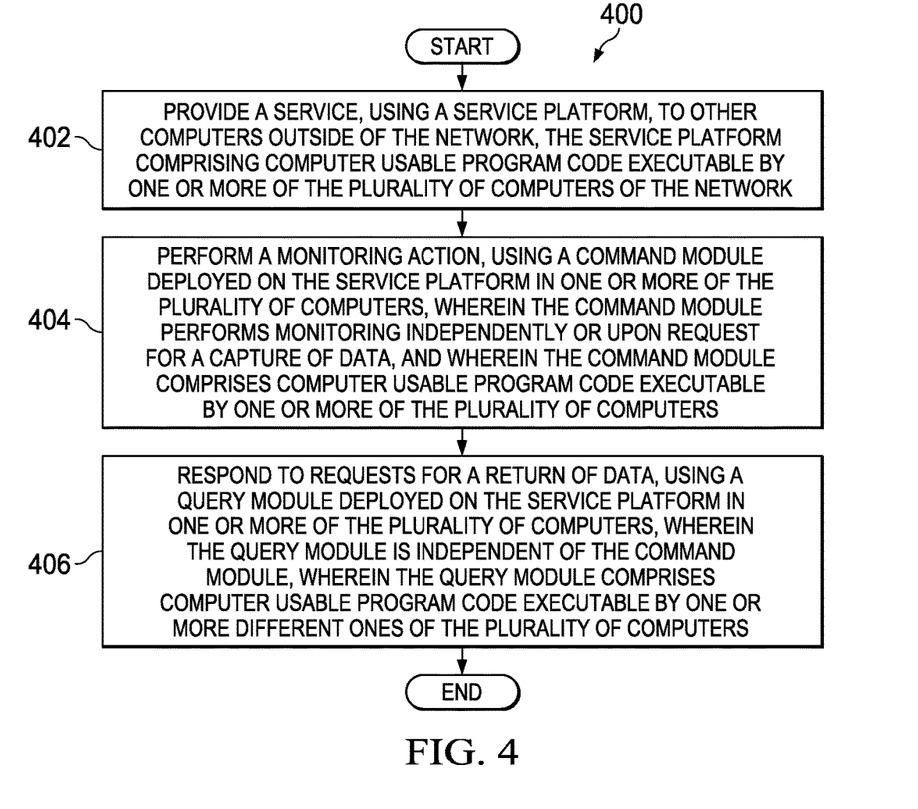
FIG. 4 is a flowchart of a method of performing command-query based monitoring of a service platform, in accordance with an illustrative embodiment.

FIG. 4 is a flowchart of a method of performing command-query based monitoring of a service platform, in accordance with an illustrative embodiment. Method 400 may be implemented using one or more data processing systems, possibly distributed over a network, such as data processing system 500 of FIG. 5. Method 400 may be implemented using the macrocosm monitoring systems shown in FIG. 1, FIG. 2, or FIG. 3. The various operations described below state that a "process" performs an action. As used with respect to FIG. 4, the term "process" refers to computer hardware executing computer usable program code, or to the operation of hardware in the form of application specific integrated circuits. Method 400 may be a method implemented by a network of a plurality of computers, each computer in the network comprising a corresponding processor, a corresponding bus, and a corresponding memory.

In an illustrative embodiment, the process may provide a service, using a service platform, to other computers outside of the network, the service platform comprising computer usable program code executable by one or more of the plurality of computers of the network (operation 402). The process may perform a monitoring action, using a command module deployed on the service platform in one or more of the plurality of computers, wherein the command module performs monitoring independently or upon request for a capture of data, and wherein the command module comprises computer usable program code executable by one or more of the plurality of computers (operation 404).

The process may respond to requests for a return of data, using a query module deployed on the service platform in one or more of the plurality of computers, wherein the query module is independent of the command module, wherein the query module comprises computer usable program code executable by one or more different ones of the plurality of computers (operation 406). In an illustrative embodiment, the command module and the query module may be implemented using command-query separation based on imperative computer programming. In an illustrative embodiment, independence of command and query enable the capture of and review of data to be evolved independently from each other, enabling dynamic change management and responsiveness of monitoring relative to an agent-based service monitoring platform.

Method 400 may be further varied. For example, capturing the data may be performed independently and may be separated from viewing of the data. The command module may be deployed independently of the query module. Other variations are possible; thus, the claims are not necessarily limited by method 400.

Figure 5:
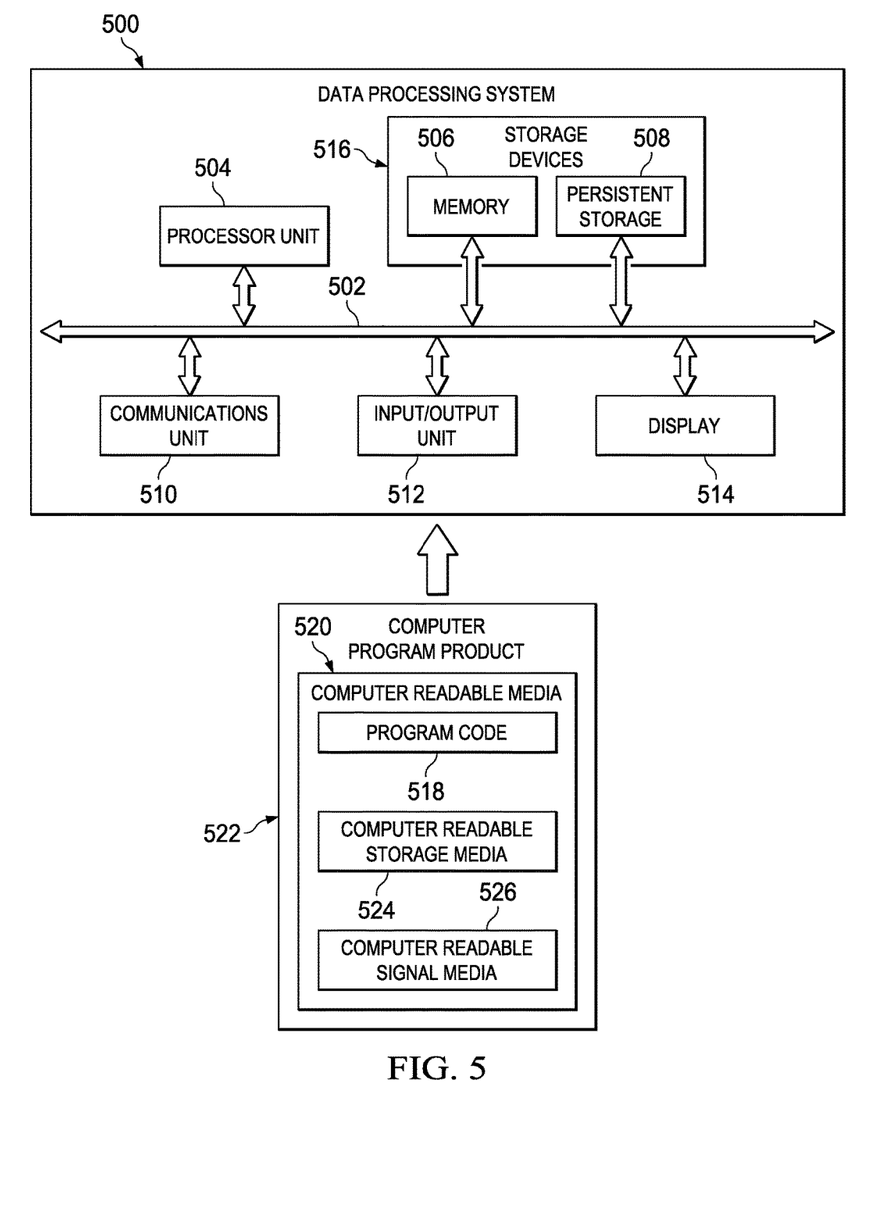
FIG. 5 illustrates a data processing system, in accordance with an illustrative embodiment.

Turning now to FIG. 5, an illustration of a data processing system is depicted in accordance with an illustrative embodiment. Data processing system 500 in FIG. 5 is an example of a data processing system that may be used to implement the illustrative embodiments, such as those described with respect to FIG. 1 through FIG. 4. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. This software may be an associative memory, content addressable memory, or software for implementing the processes described elsewhere herein. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A network comprising:
   a plurality of interconnected computers, each comprising a corresponding processor, a corresponding bus, and a corresponding memory;
   a service platform configured to provide a service to other computers outside of the network, the service platform comprising computer usable program code executable by one or more of the plurality of computers of the network;
   a data storage having a dynamic data architecture;
   a command module deployed on a first instance of the service platform, the command module configured to perform a monitoring action that pulls data from a monitored system and writes the data to the data storage, wherein the command module performs monitoring independently or upon request for a capture of the data, and wherein the command module comprises computer usable program code executable by one or more of the plurality of computers;
   a query module deployed on a second instance of the service platform, the query module configured to respond to requests for a return of data by reading the data from the data storage and returning the data to a caller, wherein the query module is independent of the command module, wherein the query module comprises computer usable program code executable by one or more different ones of the plurality of computers;
   wherein the data storage acts as a clearinghouse for data retrieved by the command module and requested by the query module;
   wherein the command module and the query module are implemented using command-query separation based on imperative computer programming; and wherein capture of and review of data is evolved independently from each other based on independence of command and query.

2. The network of claim 1, wherein capturing the data is separated from viewing of the data.

3. The network of claim 1, wherein a first type of data monitored by the command module is different than a second type of data that the query module is programmed to retrieve.

4. The network of claim 1, wherein a first type of data monitored by the command module is the same as a second type of data that the query module is programmed to retrieve.

5. The network of claim 1, wherein the command module is deployed independently of the query module.

6. The network of claim 1, wherein the command module is isolated relative to other command modules in the network, and wherein the query module is isolated relative to other query modules in the network.

7. The network of claim 1, wherein a first security context of the capture of data and a second security context of viewing of the data are different.

8. The network of claim 1, wherein the command module is one of a plurality of chained command modules, or wherein the query module is one of a plurality of chained query modules.

9. The network of claim 1, wherein the command module is one of a plurality of command modules, the query module is one of a plurality of query modules, and wherein the plurality of command modules are deployed independently of the plurality of query modules.

10. The network of claim 1, wherein the command module and the query module are distinct and independent with respect to functions of the service platform.

11. The network of claim 1, wherein at least one of the command module and the query module are received as a second service from one or more remote computers and wherein a client of the second service operates the service platform.

12. The network of claim 11, wherein the client of the second service has access to the query module, but not to the command module.

13. The network of claim 11, wherein the client of the second service has access to the command module, but not to the query module.

14. The network of claim 1, wherein the network comprises a network of networks.

15. A method implemented by a network of a plurality of computers, each computer in the network comprising a corresponding processor, a corresponding bus, and a corresponding memory, the method comprising:
    providing a service, using a service platform, to other computers outside of the network, the service platform comprising computer usable program code executable by one or more of the plurality of computers of the network;
    performing a monitoring action, using a command module deployed on a first instance of the service platform in one or more of the plurality of computers, wherein the monitoring action pulls data from a monitored system and writes the data to a data storage having a dynamic data architecture, wherein the command module performs monitoring independently or upon request for a capture of the data, and wherein the command module comprises computer usable program code executable by one or more of the plurality of computers;
    responding to requests for a return of data, using a query module deployed on a second instance of the service platform in one or more of the plurality of computers, by reading the data from the data storage and returning the data to a caller, wherein the query module is independent of the command module, wherein the query module comprises computer usable program code executable by one or more different ones of the plurality of computers;
    wherein the data storage acts as a clearinghouse for data retrieved by the command module and requested by the query module;
    wherein the command module and the query module are implemented using command-query separation based on imperative computer programming; and
    wherein capture of and review of data is evolved independently from each other based on independence of command and query.

16. The method of claim 15 further comprising:
    capturing the data independently and separated from viewing of the data.

17. The method of claim 15 further comprising:
    deploying the command module independently of the query module.

18. A non-transitory computer readable storage medium storing computer usable program code which, when executed by one or more processors, implements a method implemented by a network of a plurality of computers, each computer in the network comprising a corresponding processor, a corresponding bus, and a corresponding memory, wherein the computer usable program code comprises:
    computer usable program code for providing a service, using a service platform, to other computers outside of the network, the service platform comprising computer usable program code executable by one or more of the plurality of computers of the network;
    computer usable program code for performing a monitoring action, using a command module deployed on a first instance of the service platform in one or more of the plurality of computers, wherein the monitoring action pulls data from a monitored system and writes the data to a data storage having a dynamic data architecture, wherein the command module performs monitoring independently or upon request for a capture of data, and wherein the command module comprises computer usable program code executable by one or more of the plurality of computers;
    computer usable program code for responding to requests for a return of data, using a query module deployed on a second instance of the service platform in one or more of the plurality of computers, by reading the data from the data storage and returning the data to a caller, wherein the query module is independent of the command module, wherein the query module comprises computer usable program code executable by one or more different ones of the plurality of computers;
    wherein the data storage acts as a clearinghouse for data retrieved by the command module and requested by the query module;
    wherein the command module and the query module are implemented using command-query separation based on imperative computer programming; and
    wherein capture of and review of data is evolved independently from each other based on independence of command and query.

19. The non-transitory computer readable storage medium of claim 18, wherein the computer usable program code further comprises:
  computer usable program code for capturing the data independently and separated from viewing of the data.

20. The non-transitory computer readable storage medium of claim 18, wherein the computer usable program code further comprises:
  computer usable program code for deploying the command module independently of the query module.

* * * * *